United States Patent
Davey et al.

(10) Patent No.: US 9,626,175 B2
(45) Date of Patent: Apr. 18, 2017

(54) METHOD AND APPARATUS FOR SOFTWARE UPDATING

(71) Applicant: Ford Global Technologies, LLC, Dearborn, MI (US)

(72) Inventors: Christopher K. Davey, Novi, MI (US); Rajya Adibhatla, Novi, MI (US); Chad Evert Esselink, Canton, MI (US); Gerald P. Humphreys, Davisburg, MI (US); Salwan H. Ishac, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 251 days.

(21) Appl. No.: 13/954,194

(22) Filed: Jul. 30, 2013

(65) Prior Publication Data
US 2013/0318517 A1 Nov. 28, 2013

Related U.S. Application Data

(63) Continuation of application No. 13/206,615, filed on Aug. 10, 2011, now abandoned.

(51) Int. Cl.
*G06F 9/445* (2006.01)

(52) U.S. Cl.
CPC . *G06F 8/65* (2013.01); *G06F 8/61* (2013.01)

(58) Field of Classification Search
None
See application file for complete search history.

(56) References Cited

U.S. PATENT DOCUMENTS

| 7,366,589 B2 | 4/2008 | Habermas |
| 7,506,309 B2 | 3/2009 | Schaefer |

(Continued)

FOREIGN PATENT DOCUMENTS

| CN | 1852534 A | 10/2006 |
| DE | 102004017602 A1 | 10/2005 |
| WO | 2009027208 A1 | 5/2009 |

OTHER PUBLICATIONS

Ryu et al. The Design of Remote Vehicle Management System Based on OMA DM Protocol and AUTOSAR S/W Architecture. International Conference on Advanced Language Processing and Web Information Technology, Jul. 23-25, 2008. Retrieved on [Nov. 28, 2016] Retrieved from the Internet: URL<http://ieeexplore.ieee.org/stamp/stamp.jsp?arnumber=4584399>.*

(Continued)

*Primary Examiner* — Tuan Q. Dam
*Assistant Examiner* — Cheneca Smith
(74) *Attorney, Agent, or Firm* — Jennifer Stec; Brooks Kushman P.C.

(57) ABSTRACT

A computer-implemented method includes receiving a restore command to restore a vehicle computing system (VCS) system state. The method further includes restoring a base system state to a known, functional state and obtaining a list of applications previously installed on the VCS. The method also includes for each application previously installed on the VCS, finding a version of the application compatible with the restored base system state. Also, the method includes installing the version of each application compatible with the restored base system state.

12 Claims, 4 Drawing Sheets

(56) References Cited

U.S. PATENT DOCUMENTS

| | | | |
|---|---|---|---|
| 7,676,804 B2* | 3/2010 | Ferguson | B66C 13/18 |
| | | | 717/168 |
| 7,848,278 B2 | 12/2010 | Chen et al. | |
| 8,332,817 B2 | 12/2012 | Li et al. | |
| 2003/0167354 A1 | 9/2003 | Peppers et al. | |
| 2004/0187011 A1 | 9/2004 | Lee et al. | |
| 2004/0261073 A1 | 12/2004 | Herle et al. | |
| 2005/0149481 A1 | 7/2005 | Hesselink et al. | |
| 2005/0152318 A1 | 7/2005 | Elbatt et al. | |
| 2005/0216902 A1 | 9/2005 | Schaefer | |
| 2005/0256614 A1 | 11/2005 | Habermas | |
| 2005/0262498 A1* | 11/2005 | Ferguson | G06F 8/65 |
| | | | 717/172 |
| 2007/0168957 A1 | 7/2007 | Li et al. | |
| 2007/0185624 A1 | 8/2007 | Duddles et al. | |
| 2007/0234352 A1* | 10/2007 | Esders | G06F 8/61 |
| | | | 717/175 |
| 2007/0240152 A1 | 10/2007 | Li et al. | |
| 2008/0005733 A1 | 1/2008 | Ramachandran et al. | |
| 2008/0162036 A1 | 7/2008 | Breed | |
| 2008/0301667 A1* | 12/2008 | Rao | G06F 8/61 |
| | | | 717/172 |
| 2009/0077549 A1* | 3/2009 | Sadja et al. | 717/178 |
| 2009/0260004 A1* | 10/2009 | Datta | G06F 8/65 |
| | | | 717/175 |
| 2009/0260057 A1 | 10/2009 | Laberteaux et al. | |
| 2009/0300596 A1* | 12/2009 | Tyhurst | G06F 8/65 |
| | | | 717/173 |
| 2009/0307682 A1* | 12/2009 | Gharabally et al. | 717/172 |
| 2009/0307683 A1* | 12/2009 | Gharabally | 717/173 |
| 2010/0169876 A1* | 7/2010 | Mann | G06F 8/65 |
| | | | 717/170 |
| 2010/0235433 A1* | 9/2010 | Ansari | G06Q 30/04 |
| | | | 709/203 |
| 2011/0078675 A1 | 3/2011 | Van Camp et al. | |
| 2011/0320089 A1* | 12/2011 | Lewis | 701/32 |
| 2011/0321028 A1* | 12/2011 | Evans | G06F 8/68 |
| | | | 717/170 |
| 2012/0124568 A1* | 5/2012 | Fallon | G06F 9/4446 |
| | | | 717/169 |
| 2012/0144378 A1 | 6/2012 | Shah | |
| 2013/0031540 A1 | 1/2013 | Throop et al. | |

OTHER PUBLICATIONS

Macario et al "An in-vehicle infotainment software architecture based on google android." 2009 IEEE International Symposium on Industrial Embedded Systems. IEEE, 2009.Retrieved on [Nov. 28, 2016] Retrieved from the Internet:URL<http://ieeexplore.ieee.org/document/5196223/?arnumber=5196223>.*

Drew Technologies—CarDAQ-Plus J2534 Pass-Thru & Hosting Device, printed from allobd.com/proddetail, Oct. 29, 2010.

Lancer Evolution: ECU Reflash Upgrade—2009 Ralliart remote ECU reflashing services, printed from http://www.floridaevosclub.com/f32/2009-ralliart-remote-ecu-reflashing-services-41.htm, Sep. 17, 2009.

Ford Motor Company, "SYNC with navigation System," Owner's Guide Supplement, SYNC System Version 1 (Jul. 2007).

Ford Motor Company, "SYNC," Owner's Guide Supplement, SYNC System Version 1 (Nov. 2007).

Ford Motor Company, "SYNC with navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

Chinese Patent Office, First Office Action for the corresponding Chinese Patent Application No. 201210279208.2, mailed Aug. 23, 2016.

* cited by examiner

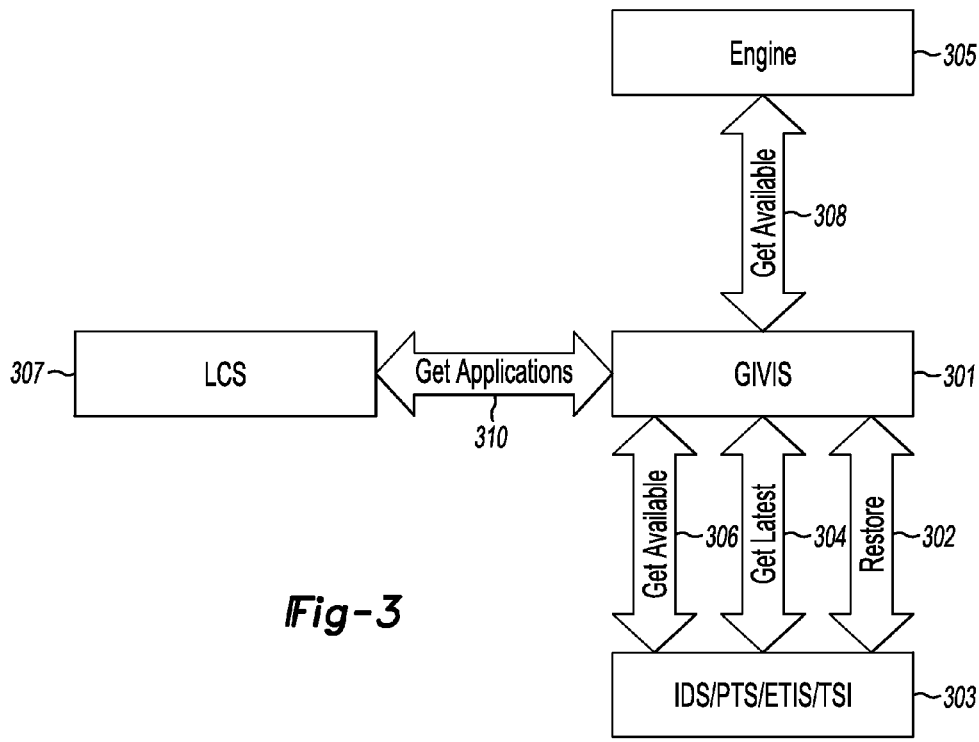
Fig-3
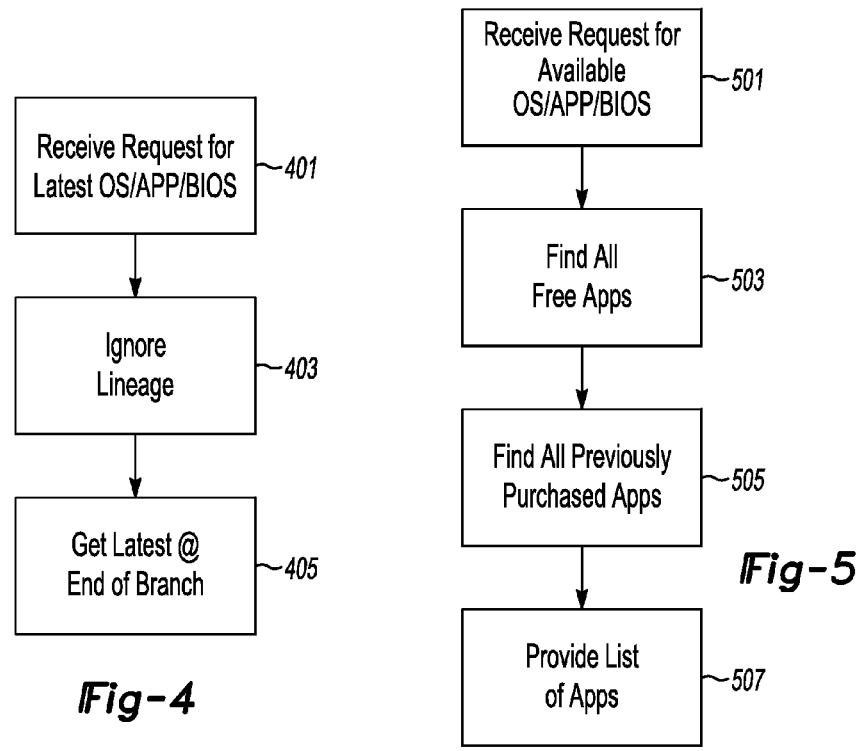
Fig-4
Fig-5

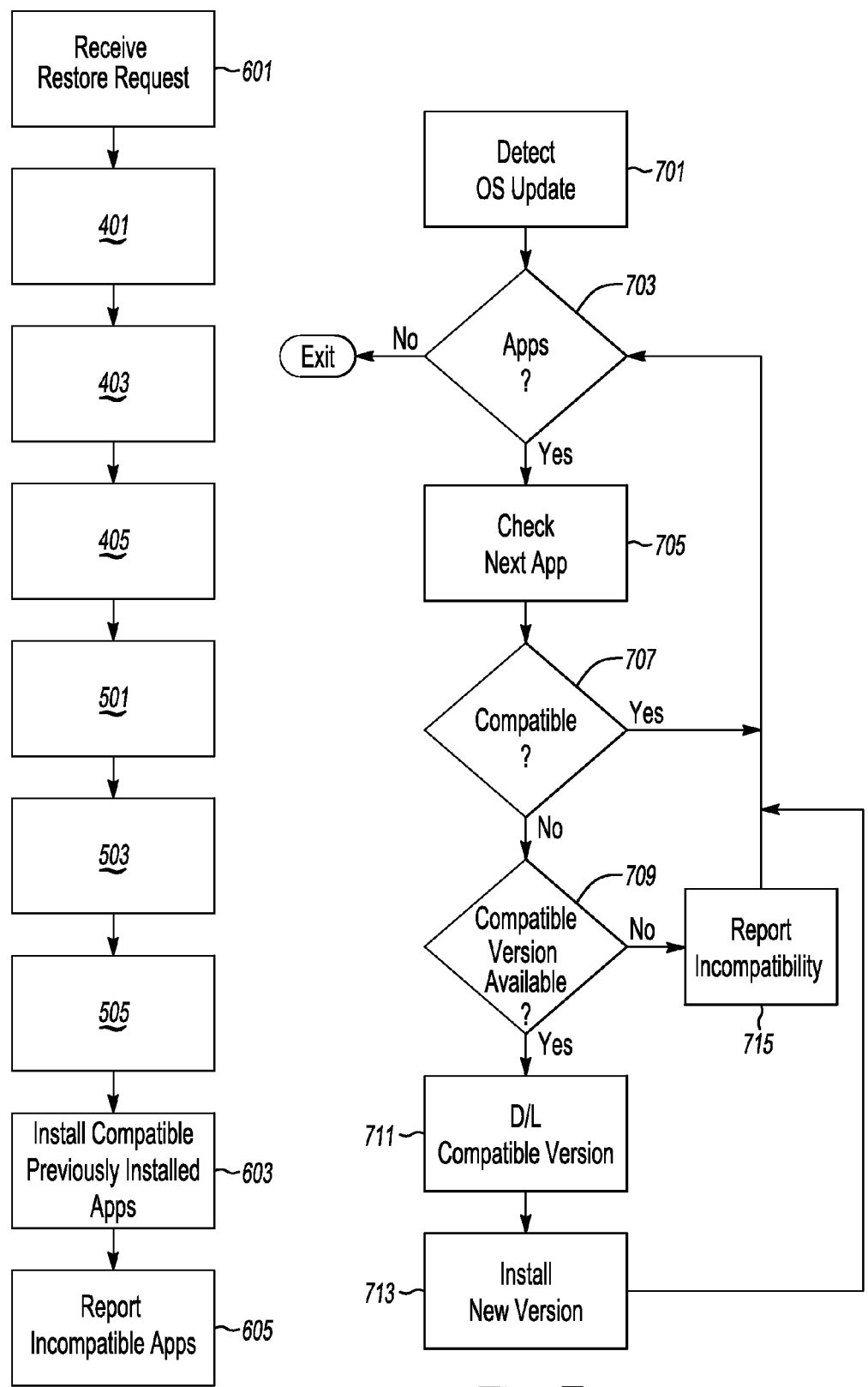

METHOD AND APPARATUS FOR SOFTWARE UPDATING

CROSS-REFERENCE TO RELATED APPLICATIONS

This application is a continuation of U.S. application Ser. No. 13/206,615, filed Aug. 10, 2011, which application is hereby incorporated by reference in its entirety.

TECHNICAL FIELD

The illustrative embodiments generally relate to a method and apparatus for software updating.

BACKGROUND

With advances in computing technology presenting new opportunities constantly, it is often desirable to update an operating system. Forming the backbone of a platform, the operating system brings together all the components of a computing system into a functioning base from which numerous software applications can be launched.

PC operating systems often have many updates available. Either to better use existing resources or to optimally use newly available technology, operating system updates can provide an ever improving fundament on which an end-user experience can be built. Whether it is a new operating system entirely, or a version update to an existing system, there are numerous reasons why a user may wish to update an operating system on a PC.

In the PC-model of the computing platform, once a PC is purchased it is generally up to a user to update the operating system. Since the manufacturer typically has little to no contact with the PC once the initial purchase is made, a user must rely on their own desire and actions to provide updates to the system. Some operating systems may have automatic download of new patches and updates provided therewith, but again, it is typically the user that initiates this auto-update process, and it is on the shoulders of the user to ensure that existing software products will work with the new operating system.

Another model now exists, however, that of mobile computing. Devices such as PDAs, smartphones, and even vehicles may carry mobile computing systems therein, and the providers of these devices in many cases will still have a vested interest in ensuring the continued functionality of the device.

For example, a smartphone not only serves as a portable computing device, but it also serves as a platform from which cellular phone calls may be made. Since there is typically a service contract associated with the device, often for both cellular and data transfer services, it is in the best interest of the service provider to ensure that operating system updates are performed on the device as needed.

At the same time, as with personal computers, software developers are constantly developing applications for use on mobile computing devices. Since many of these devices only have limited restrictions on the nature and details of a particular application that may be developed for the device, it may be difficult for the manufacturer/provider of the device to ensure that all applications are compatible with a new operating system or operating system version. Consequently, changes to the operating system may cause certain applications to function differently, or to lose functionality altogether.

Thus, it is typically incumbent on the user to ensure that a new version of a particular application is downloaded and installed when an operating system is updated. Similarly, developers must make sure that the applications are kept up to date so as to function on new versions of operating system software/firmware.

Unlike the world of PCs, however, because device providers in the mobile computing world typically maintain a more integrated relationship with the consumers using their products, consumers may tend to misplace fault with the system provider if an operating system update disables or renders unusable one or more of the applications installed on the mobile computing device.

SUMMARY

In a first illustrative embodiment, a computer-implemented method includes receiving a restore command to restore a vehicle computing system (VCS) system state. The illustrative method further includes restoring a base system state to a known, functional state and obtaining a list of applications previously installed on the VCS.

In this embodiment, the illustrative method also includes for each application previously installed on the VCS, finding a version of the application compatible with the restored base system state. Also, the illustrative method includes installing the version of each application compatible with the restored base system state.

In a second illustrative embodiment, a machine readable storage medium stores instructions that, when executed, cause a processor of a vehicle computing system (VCS) to execute a method including receiving a restore command to restore a VCS system state. The method also includes restoring a base system state to a known, functional state and obtaining a list of applications previously installed on the VCS.

In this embodiment, the method further includes for each application previously installed on the VCS, finding a version of the application compatible with the restored base system state. The method also includes installing the version of each application compatible with the restored base system state.

In a third illustrative embodiment, a system includes a vehicle computing system (VCS) a vehicle computing system (VCS), a diagnostic service tool (DST) and a remote global in-vehicle information system (GIVIS). In this embodiment, the DST is operable to generate a restore command to the GIVIS.

Also, in this embodiment, upon receiving the restore command, the GIVIS is operable to download and install a known, functional VCS operating system on the VCS. Following installation of the operating system, the VCS is further operable to communicate with the GIVIS to receive, for each application previously installed on the VCS, a most recent version of the application, compatible with the installed operating system. Additionally, the GIVIS is operable to instruct installation each of the most recent versions of the applications compatible with the installed operating system on the VCS.

BRIEF DESCRIPTION OF THE DRAWINGS

FIG. 3 shows an illustrative example of a software maintenance model;

FIG. 4 shows an illustrative example of a software update process;

FIG. 5 shows an illustrative example of a second software update process;

FIG. 6 shows an illustrative example of a restoration process; and

FIG. 7 shows an illustrative example of an operating system update process.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
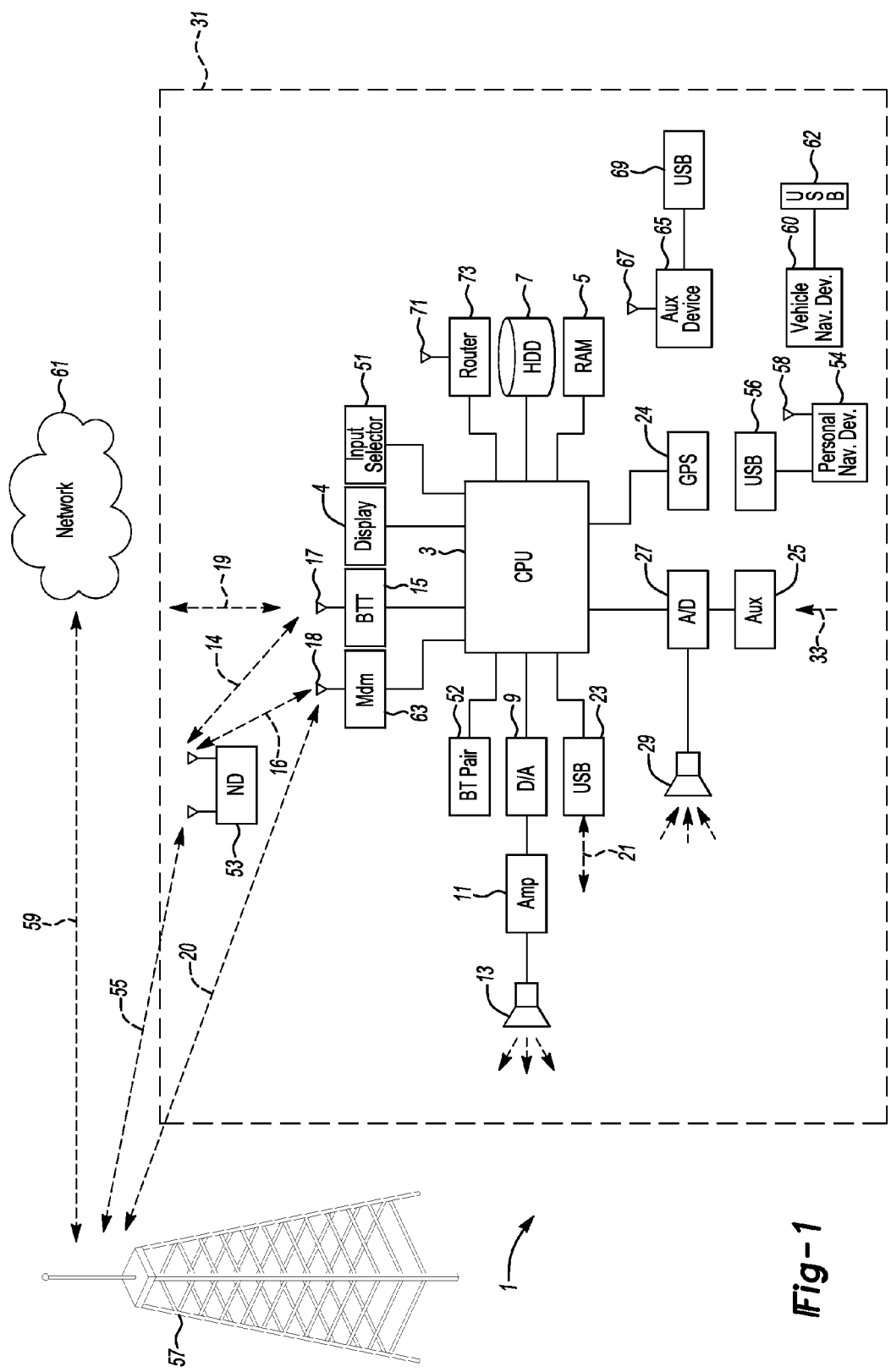
FIG. 1 shows an illustrative example of a vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domain Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
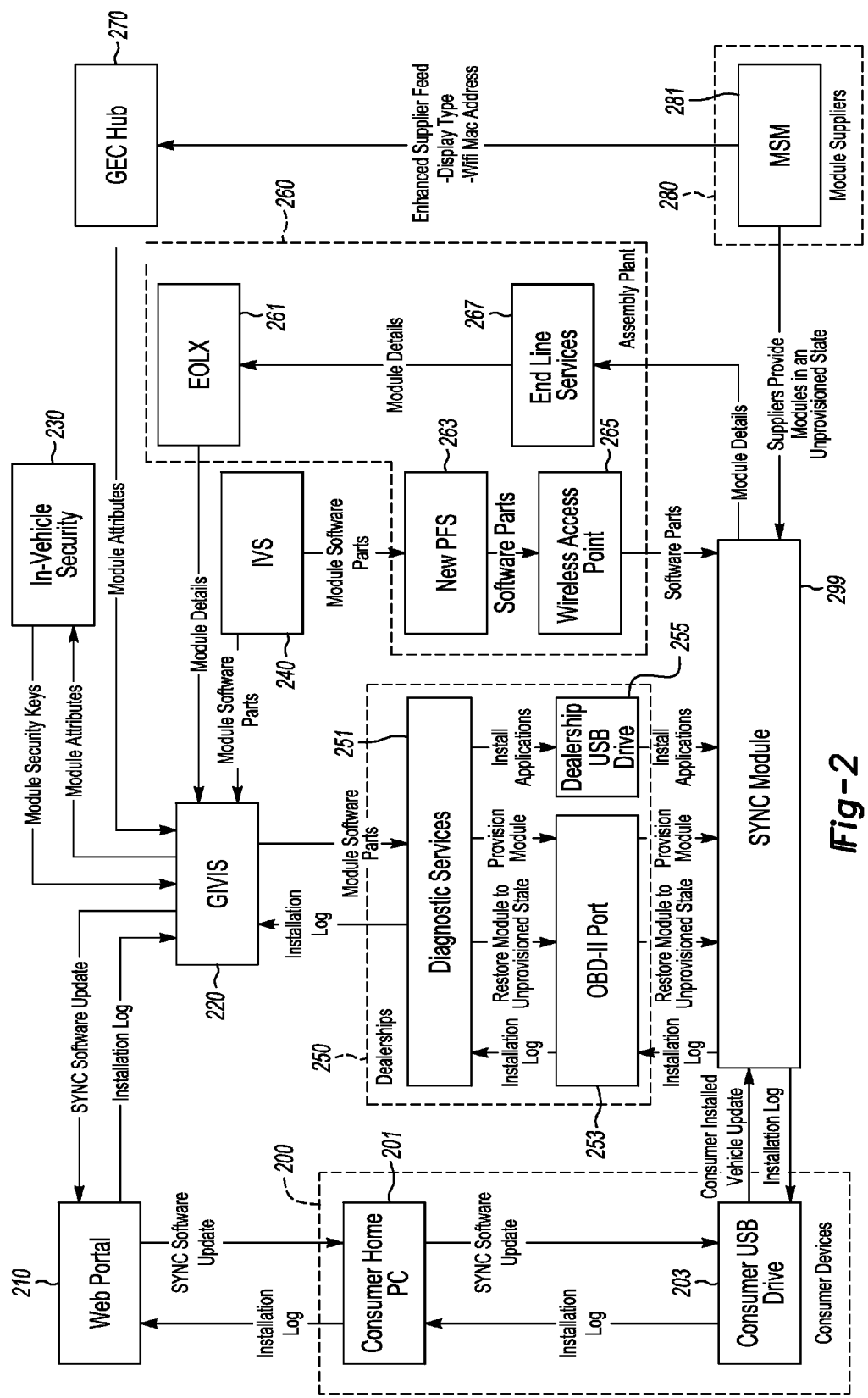
FIG. 2 shows an illustrative example of a software maintenance ecosystem.

FIG. 2 shows an illustrative example of a software maintenance ecosystem. This illustrative embodiment shows one non-limiting example of a relationship between a vehicles computing system, consumer devices, dealerships/service centers, OEM assembly and module suppliers.

In this example, the core of the mobile computing platform is the VCS module 299. This module represents the current version of the operating system installed on the VCS, and any applications and application versions also installed in the system. Updates to this module, especially to the operating system, should attempt to preserve as much compatibility as possible, so that applications function in the manner in which users expect and avoid being disabled.

One point of initial configuration for this module may be the OEM assembly plant 260. At some point during vehicle assembly, the VCS module 299 may have a variety of software applications installed thereon via, for example, a wireless access point 265. The wireless access point can receive the particular software "parts" to be installed from the new plant floor system (PFS) 263. The PFS may receive module software parts from an in-vehicle software (IVS) system 240, which can also send those parts (or at least record of those parts) to the GIVIS system 220.

For example, without limitation, if a navigation system is detected in a vehicle, the VCS module will know it needs one or more software parts corresponding to the navigation system. The module can then request the needed parts from the plant floor system.

Once all the software parts have been installed, the VCS module can communicate module details back to the endline system 267, which can relay those details to an EOLX 261. This also can serve as confirmation that all software parts were installed successfully. The information can be sent from the EOLX to the GIVIS system 220, so that a global record of the module details can be had.

While initial installation is ongoing, module suppliers 280 may provide modules for use in conjunction with the VCS module, including security keys for use of particular modules. A Module Supplier Manufacturing (MSM) system 281 may send these modules to the VCS module in an unprovisioned state. Also, the system 281 may send an enhanced supplier feed to a GEC Hub 270, and the data from this hub can be stored in the GIVIS system to maintain a record of modules/security keys installed for use with the VCS module.

In addition to storing the module details relayed from the EOLX, the GIVIS can relay module attributes, such as security keys to an In-Vehicle Security system 230. System 230 can provide the encryption/decryption functionality for information passing through the GIVIS, and provides an additional layer of security by being one level removed from the GIVIS.

At some future point following assembly of the vehicle and initialization of the module, a dealership 250 may have an diagnostics tool system 251 provided thereto. This system can provide commands for application install (along with application data) to a USB drive 255 usable by a technician at the dealership to install applications and other software on the VCS module.

Record of the installation may be sent over the ODB-II Port 253 to maintain a log of installed applications and/or application versions. Additionally, the ODB-II Port may be used by a technician to restore the VCS module to an unprovisioned state, and further to provision the module, for example, following a restore. Software and/or commands for restoring the module and provisioning the module may come from the diagnostics system, which may also receive a copy of the installation log from the ODB-II Port to relay to the GIVIS. Once all applications have been installed and the module(s) provisioned, a module/application state can be relayed from the vehicle to the GIVIS.

Consumer devices, namely, in this example, a USB drive 203 receiving data from a consumer PC 201, may also interact with the VCS module. The consumer PC may have software updates usable/installable on the module, and this data may be sent to a USB drive for installation into the module.

The consumer PC may receive this software data from a web portal system 210, which can be informed of updates from the GIVIS system, which should know a current state of the particular VCS module, at least from tracking installation logs and storing module details.

Once the data has been installed in the VCS module from the USB drive, an installation log can be sent from the VCS module to the USB drive, relayed to the home PC, and sent from there to the web portal system. That system can then relay the information to the GIVIS system to maintain a current record of installed software on the VCS module.

FIG. 3 shows an illustrative example of a software maintenance model. In this illustrative embodiment, the GIVIS system 301 cab access an SMR/ENGINE/APA system 305 to determine available versions of applications 308 that may be installed with respect to a VCS module.

The GIVIS system may also interface with an IDS/PTS/ETIS/TSI system 303 to provide available applications (e.g., without limitation, versions of free and previously purchased applications) that can be installed with respect to a VCS module. Communication with system 303 may also include a get latest communication.

In a get latest communication, the system determines an installation package with the latest (e.g., without limitation, most up-to-date) version of a software package for a module's latest state.

In at least one example, a "free" version of software may be installed, having a first set of features. This will be branch A of a software lineage. Updates may be provided to the software in this version to maintain compliance, and as long as a user elects to maintain the first version of the software, no cost will be incurred.

In addition, at some point, a second "paid" version of the software may also be available, having an additional set of features or enhanced versions of the first set of features. This will be branch B of the software lineage.

If a user elects to maintain usage of the free version, then a "get latest" command may proceed to the end of the branch A lineage, preserving the free state of the software version, while skipping intermittent updates to install the most up-to-date version of the branch.

On the other hand, if a user had, at some point, branched to branch B, installing the paid version of the software, the "get latest" may retrieve the most up-to-date version of that branch.

If, instead, a "get available" command was implemented, the user may be presented with options to maintain a free version of software or to switch to a paid version of software if both options were available and compatible with a current state of the VCS module.

In another example, branching may occur to maintain compatibility when a plurality of modules interact with each other. Installation of a certain software application that interacts with other applications may require installation of a new version of applications with which the certain software application interacts. Upon receiving a get latest command, the system may get the latest version of any of these applications that maintained compatibility with the other interacting applications. Upon receiving a get available command, the system may only get available versions of a particular application that maintains the compatibility with other installed, interacting applications.

Applications, and new versions of applications may be known to an LCS system 307 and notification of these applications may be sent to the GIVIS system. Through communication with the LCS system 310, a GIVIS system may determine which applications and versions of applications are appropriate to present based on which command (e.g., get latest, get available, restore, etc.) is being executed. The IVS system may present the actual applications to the GIVIS system.

A restore command 302, processed between system 303 and a GIVIS system, will restore the operating state of a VCS module to a known working state or specified version. Of course, this may cause incompatibilities with existing software that is installed on the VCS module, so typically a get latest command will be processed in conjunction with a restore command. Processing the get latest command should help ensure that compatible versions of all existing software are then obtained and installed on the newly restored VCS module, and functionality with respect to the restored state should be maintained.

FIG. 4 shows an illustrative example of a software update process. In this illustrative example, a request is made for a latest version of an operating system, application, BIOS, etc. 401. Software applications, for example, often have a lineage associated therewith. The version number of the software may determine where in the lineage the particular version lies, what the initial software was, what configuration or update decisions have been made, and what future versions or updates are available and compatible with that version. In certain instances, lineages branch based on configurations and installed features, and lineages forward from that point may continue down a particular branch, corresponding to the previously installed version.

In the process shown in FIG. 4, in response to the request for the latest version, the forward lineage of existing software is ignored 403. That is, a "next" version of the software will not be installed, nor will any updates along the lineage between a current lineage location and the end of a branch. Instead, the process proceeds to the end of an existing branch and finds the latest version of the software compatible with the module and installs that version 405.

FIG. 5 shows an illustrative example of a second software update process. In this illustrative example, a request is made for available updates to a module 501. In response to the request, a list of all free applications 503 and previously purchased applications 505 is compiled and provided to a user 507. The user can then peruse the list and select which applications and versions of those applications should be installed on the module.

As previously discussed, different versions of software may provide different options and lineages. For example, a user may elect a certain version of software with a get available command, and then further execute a get latest command to ensure the latest, compatible form of the selected version is installed on a mobile computing system.

FIG. 6 shows an illustrative example of a restoration process. When a restore request is received 601, the process will first get the latest version of an operating system and/or BIOS for installation 401, 403, 405.

After the latest compatible version is installed in the VCS, the process will then find all free and purchased applications that were previously installed on the VCS 501, 503, 505. Instead of presenting these as options for a user, however, a get latest command may be performed with respect to each discovered available application that corresponds to a previously installed application. Thus, based on the newly restored operating system/BIOS state, the system will install the latest, compatible versions of all previously installed applications. These applications may be double-checked for compatibility and installed in the event that they are compatible with the OS/BIOS installed in response to the restoration request 603.

In the event that any incompatibilities exist between the previously installed applications and the newly installed operating system, the system will report the incompatibilities to the user 605 so that the user is aware that those applications may not function on the new system.

FIG. 7 shows an illustrative example of an operating system update process. In this illustrative example, an update to the operating system is detected 701. Because incompatibilities may exist with installed applications, it is determined if any existing applications are installed on the mobile computing platform 703.

If no applications have been installed, or if all installed applications are compatible with the newly update operating system, the process exits. This varies from a typical computing environment, where a user must ensure the existing compatibility of applications by manually checking some or all of the applications for continued compatibility.

If at least one un-verified application exists 703, that application is checked by the process 705 to ensure compatibility 707. In at least one example, the provider of this process will know which versions of applications are compatible with which versions of operating systems, and the application version number can be used to determine compatibility of that application.

If the application is incompatible in its present version 707, the process then determines if a compatible version of the application is available 709. This version could correspond to a next version of an application, or could be a version that is somewhere further down a lineage from the current version of the installed application.

The compatible version may be downloaded to the platform at this point 711. This version could correspond to a first compatible version of the application, or it could correspond to a more recently available version of the application, beyond a point of first compatibility. In this manner, users can not only be provided with a compatible version, but they can be provided with the most up-to-date version of the application which is compatible. The new version of the application is then installed on the platform 713 and the process continues checking for incompatible applications.

If an application is incompatible 707 and no compatible version of the application exists 709, the user may be informed that the particular application has no known compatible version, and will be disabled at least temporarily. It may then be possible for the user to check for future compatible versions or for the process itself to periodically check for compatible versions.

Additionally or alternatively, system configurations may be stored remotely, and upon the development of a compatible version of an application, all systems previously having that application disabled may be notified of the new version, or even have the new version automatically installed thereon.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer implemented method comprising:
   receiving vehicle computer software update availability notification;
   responsive to the notification, presenting a user with an option to select an update to an instance of software from multiple compatible newer software versions along branching software lineages, wherein one version lineage corresponds to a current installed software lineage and another version lineage is different from the current lineage; and
   processing, via a vehicle computer, a received update selection to update the software.

2. The method of claim 1, wherein the method further includes obtaining a most recent compatible update, in a selected lineage, for installation.

3. The method of claim 1, wherein the user is at least provided with an option to upload a most recent compatible version of the software and the method further includes obtaining a most recent compatible update for installation.

4. The method of claim 3, wherein the one version lineage corresponds to the current installed software lineage, distinct from the another version lineage, and wherein the method further includes obtaining the most recent compatible update from the current installed software lineage.

5. A system comprising:
   a processor configured to:
   receive vehicle computer software update availability notification;
   responsive to the notification, present a user with an option to select an update to an instance of software from multiple compatible newer software versions along branching software lineages, wherein one version lineage corresponds to a current installed software lineage and another version lineage is different from the current lineage; and
   process a received update selection to update the software.

6. The system of claim 5, wherein the processor is further configured to obtain a most recent compatible update, in a selected lineage, for installation.

7. The system of claim 5, wherein the user is at least provided with an option to upload a most recent compatible version of the software and the processor is configured to obtain a most recent compatible update for installation.

8. The system of claim 7, wherein the one version lineage corresponds to the current installed software lineage, distinct from the another version lineage, and wherein the processor is configured to obtain the most recent compatible update from the current installed software lineage.

9. A non-transitory computer readable storage medium, storing instructions that, when executed by a vehicle computer, cause the computer to perform a method comprising:
   receiving vehicle computer software update availability notification;

responsive to the notification, presenting a user with an option to select an update to an instance of software from multiple compatible newer software versions along branching software lineages, wherein one version lineage corresponds to a current installed software lineage and another version lineage is different from the current lineage; and processing, via a vehicle computer, a received update selection to update the vehicle computer software.

10. The computer readable storage medium of claim 9, wherein the method further includes obtaining a most recent compatible update, in a selected lineage, for installation.

11. The computer readable storage medium of claim 9, wherein the user is at least provided with an option to upload a most recent compatible version of the software and the method further includes obtaining a most recent compatible update for installation.

12. The computer readable storage medium of claim 11, wherein the one version lineage corresponds to the current installed software lineage, distinct from the another version lineage, and wherein the method further includes obtaining the most recent compatible update from the current installed software lineage.

* * * * *